US008510369B1

(12) United States Patent
Ekke et al.

(10) Patent No.: US 8,510,369 B1
(45) Date of Patent: Aug. 13, 2013

(54) METHOD AND SYSTEM FOR ADDING PLUG-IN FUNCTIONALITY TO VIRTUALIZED APPLICATIONS

(75) Inventors: Prasad Dilip Ekke, Maharashtra (IN); Sarin Sumit Manmohan, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 319 days.

(21) Appl. No.: 13/048,786

(22) Filed: Mar. 15, 2011

(51) Int. Cl.
*G06F 15/16* (2006.01)

(52) U.S. Cl.
USPC ............ 709/202; 709/201; 709/220; 709/221

(58) Field of Classification Search
USPC .................................. 709/201, 202, 220, 221
See application file for complete search history.

(56) References Cited

U.S. PATENT DOCUMENTS

| | | | |
|---|---|---|---|
| 6,484,109 B1 * | 11/2002 | Lofall | 702/56 |
| 7,950,026 B1 * | 5/2011 | Urbach | 719/329 |
| 8,224,796 B1 * | 7/2012 | Shinde et al. | 707/695 |
| 2009/0007139 A1 * | 1/2009 | Jacobson et al. | 719/313 |
| 2009/0049115 A1 * | 2/2009 | Jenkins et al. | 709/202 |
| 2010/0211854 A1 * | 8/2010 | Wu et al. | 714/776 |
| 2010/0241731 A1 * | 9/2010 | Du et al. | 709/218 |
| 2010/0268934 A1 * | 10/2010 | Hinton et al. | 713/152 |
| 2011/0161404 A1 * | 6/2011 | Ekstrom et al. | 709/203 |
| 2011/0173089 A1 * | 7/2011 | Tan | 705/26.7 |

* cited by examiner

*Primary Examiner* — Liangche A Wang
(74) *Attorney, Agent, or Firm* — Lowenstein Sandler LLP

(57) ABSTRACT

A computing system invokes a proxy agent in a virtual environment hosted by the computing system to obtain configuration change data for a virtualized application from an agent residing in a physical environment hosted by the computing system. The proxy agent changes a configuration of the virtualized application based on the configuration change data to cause the virtualized application to load a plug-in in the virtual environment. The computing system launches the virtualized application and the virtualized application loads the plug-in in the virtual environment to utilize a function of the plug-in in the virtual environment.

18 Claims, 4 Drawing Sheets

METHOD AND SYSTEM FOR ADDING PLUG-IN FUNCTIONALITY TO VIRTUALIZED APPLICATIONS

TECHNICAL FIELD

Embodiments of the present invention relate to virtualized applications. Specifically, the embodiments of the present invention relate to adding plug-in functionality to virtualized applications.

BACKGROUND

A virtual application is an application that has been optimized to run on a virtual infrastructure. A fully virtualized application is not installed in a traditional sense, although it is executed as if it were. At runtime, the virtualized application 'believes' it is directly interfacing with an operating system and all of the resources managed by it, but in actuality it is not. Virtualized applications run in a virtual environment, such as a sandbox or a container, in a computing system and cannot access resources, applications, and plug-ins that reside outside of the virtual environment, such as resources, applications, and plug-ins that reside in a computing system's physical environment (physical memory). Many plug-ins that reside in the physical environment exist today and provide a number of features to applications that also run in the physical environment. For example, a security plug-in, such as a Data Loss Prevention (DLP) plug-in, can monitor an application to prevent loss of sensitive data, such as confidential data. An email application that resides in the physical environment can load the DLP plug-in to monitor email messages to determine whether any sensitive data is being communicated in the email messages. The DLP plug-in can take action based on a security policy, such as blocking an email message. However, virtualized applications cannot utilize many features provided by existing plug-ins that reside in the physical environment.

SUMMARY

A method and apparatus for adding plug-in functionality to virtualized applications is described. In an exemplary method of one embodiment, a proxy agent is invoked in a virtual environment hosted by a computing system to obtain configuration change data for a virtualized application from an agent residing in a physical environment hosted by the computing system. A configuration of the virtualized application is changed by the proxy agent based on the configuration change data to cause the virtualized application to load a plug-in in the virtual environment. The virtualized application is launched in the virtual environment and the plug-in is loaded in the virtual environment to utilize a function of the plug-in in the virtual environment.

In some embodiments, the plug-in is a data loss protection plug-in to prevent loss of protected data pertaining to the virtualized application executing in the virtual environment. In some embodiments, the agent residing in the physical environment is a data loss protection agent to configure an application residing in the physical environment to prevent loss of protected data pertaining to the application residing in the physical environment. In some embodiments, the configuration change data comprises as least one of a location of the configuration of the virtualized application, data to change in the configuration of the virtualized application, a plug-in that is associated with the virtualized application, and a location of the associated plug-in. In some embodiments, invoking the proxy agent comprises a call to launch the virtualized application in the virtual environment being intercepted by a virtualization helper. In some embodiments, invoking the proxy agent comprise executing a call to launch the virtualized application in the virtual environment based on modified sequence data received from a second computing system. In some embodiments, the computing system is a client computing system.

In addition, a system for adding plug-in functionality to virtualized applications is described. An exemplary system may include a persistent storage unit and a computing system coupled to the persistent storage unit. In some embodiments of the exemplary system, the persistent storage unit is to store configuration data of a virtualized application to be loaded in a virtual environment in the computing system. In some embodiments of the exemplary system, the computing system is to invoke a proxy agent in the virtual environment to obtain configuration change data for the virtualized application from an agent residing in a physical environment, wherein the proxy agent changes the configuration data of the virtualized application based on the configuration change data received from the physical agent to cause the virtualized application to load a plug-in in the virtual environment, and to launch the virtualized application in the virtual environment, wherein the virtualized application loads the plug-in in the virtual environment to utilize a function of the plug-in in the virtual environment.

In some embodiments, the plug-in is a data loss protection plug-in to prevent loss of protected data pertaining to the virtualized application executing in the virtual environment. In some embodiments, the agent residing in the physical environment is a data loss protection agent to configure an application residing in the physical environment to prevent loss of protected data pertaining to the application residing in the physical environment. In some embodiments, the configuration change data comprises as least one of a location of the configuration of the virtualized application, data to change in the configuration of the virtualized application, a plug-in that is associated with the virtualized application, and a location of the associated plug-in. In some embodiments, to invoke the proxy agent comprises a virtualization helper hosted by the computing system to intercept a call to launch the virtualized application in the virtual environment. In some embodiments, to invoke the proxy agent comprises the computing system to execute a call to launch the virtualized application in the virtual environment based on modified sequence data received from a second computing system. In some embodiments, the computing system is a client computing system.

In some embodiments, the exemplary system comprises a persistent storage unit to store sequence data of the virtualized application and a second computing system coupled to the persistent storage unit. In some embodiments of the exemplary system, the second computing system is to modify the sequence data of the virtualized application to cause the computing system to invoke the proxy agent in the virtual environment prior to invoking the application in the virtual environment, to generate a virtualized application package for the application using the modified sequence data, and to provide the virtualized application package to a computing system to cause the computing system to invoke the proxy agent in the virtual environment, wherein the proxy agent changes a configuration of the application to cause the application to load a plug-in in the virtual environment. In some embodiments, to modify the sequence data comprises the second computing system to add an instruction to the sequence data to invoke the proxy agent in the virtual environment prior to invoking the virtualized application in the virtual environment.

Further, a computer readable storage medium for adding plug-in functionality to virtualized applications is described. An exemplary computer readable storage medium provides instructions, which when executed on a processing system causes the processing system to perform a method such as an exemplary method of one embodiment where sequence data of an application to be invoked in a virtual environment is modified to cause a computing system to invoke a proxy agent in the virtual environment prior to invoking the application in the virtual environment. A virtualized application package for the application is generated using the modified sequence data. The virtualized application package is provided to a computing system to cause the computing system to invoke the proxy agent in the virtual environment, wherein the proxy agent changes a configuration of the application to cause the application to load a plug-in in the virtual environment.

In some embodiments, modifying the sequence data comprises adding an instruction to the sequence data to invoke the proxy agent in the virtual environment prior to invoking the application in the virtual environment. In some embodiments, the plug-in is a data loss protection plug-in to prevent loss of protected data pertaining to the virtualized application executing in the virtual environment. In some embodiments, the computing system is a client computing system.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for adding plug-in functionality to virtualized applications. A computing system invokes a proxy agent in a virtual environment hosted by the computing system to obtain configuration change data for a virtualized application from an agent residing in a physical environment hosted by the computing system. The proxy agent changes a configuration of the virtualized application based on the configuration change data to cause the virtualized application to load a plug-in in the virtual environment. The computing system launches the virtualized application and the virtualized application loads the plug-in in the virtual environment to utilize a function of the plug-in in the virtual environment.

Virtualized applications run in a virtual environment, such as a sandbox or a container, and cannot access resources, applications, and plug-ins that reside outside of the virtual environment. As such, virtualized applications cannot utilize many plug-in features that exist today, such as plug-ins for data loss prevention. Embodiments of the present invention provide a mechanism to allow a virtualized application to utilize features provided by plug-ins. Embodiments automatically configure a virtualized application to load a plug-in in the virtual environment.

Figure 1:
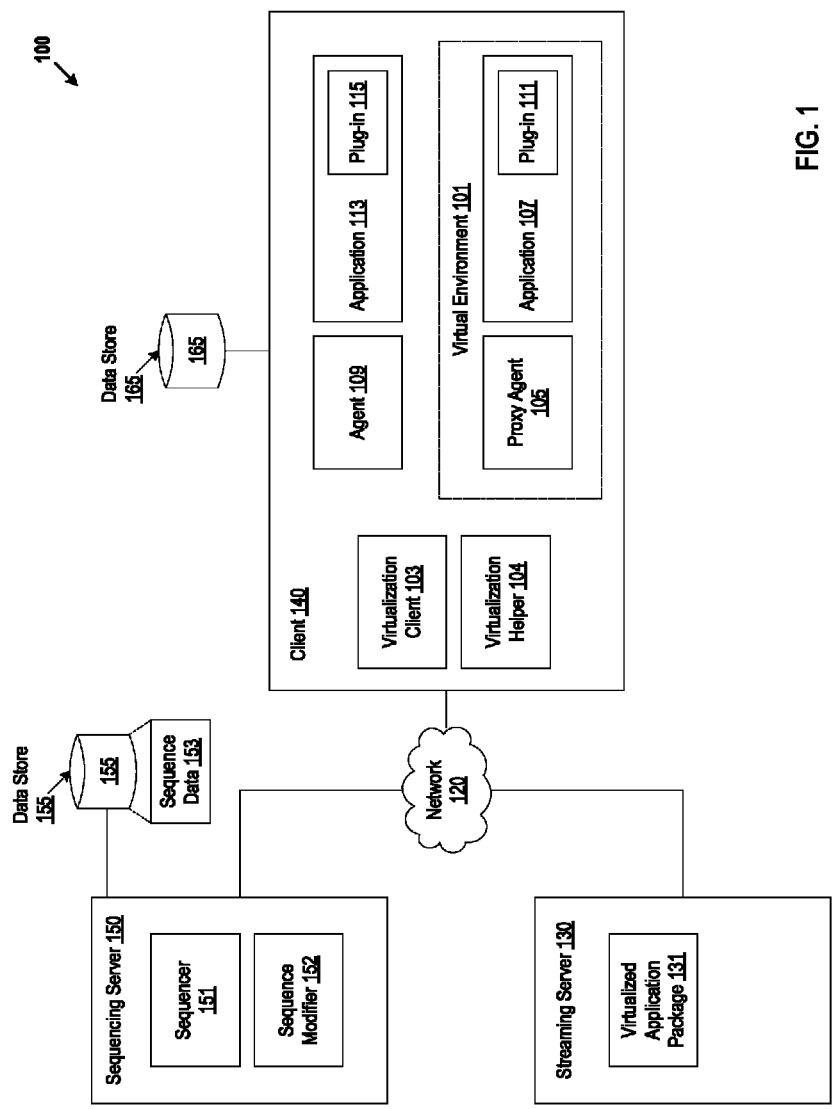
FIG. 1 is an exemplary network architecture in which embodiments of the present invention may operate.

FIG. 1 is an exemplary network architecture 100 in which embodiments of the present invention can be implemented. The network architecture 100 can include a streaming server 130, a sequencing server 150, and one or more clients 140 communicating via a network 120. The network 120 can be a local area network (LAN), such as an intranet within a company, a wireless network, a mobile communications network, a wide area network (WAN), such as the Internet, or similar communication system. The network 120 can include any number of networking and computing devices such as wired and wireless devices.

A client 140 can include an application 113 that resides in a physical environment (physical memory) of the client 140. A client 140 can include a virtual environment, such as a virtual environment 101 (e.g., sandbox), to load a virtualized application 107. A sandbox is a security mechanism for separating running programs and providing a tightly-controlled set of resources for guest programs to run in. Examples of an application 107,113 can include, and are not limited to an email application, a word processing application, a web browsing application, a database system application, and similar types of applications. The client 140 can be coupled to a data store 165 that stores one or more plug-ins 111,115 to add functionality to an application 107,113. An exemplary plug-in is a Data Loss Prevention (DLP) plug-in 111,115 that can monitor an application to prevent loss of sensitive data, such as confidential data. A plug-in 111,115 can correspond to a particular application 107,113. For example, the application 113 is a Lotus Notes® email application and the plug-in 115 is a DLP plug-in for Lotus Notes®. In another example, the virtualized application 107 is an Outlook® email application and the plug-in 111 is a DLP plug-in for Outlook®.

A client 140 can be hosted by any type of computing device including server computers, gateway computers, desktop computers, laptop computers, mobile communications devices, cell phones, smart phones, hand-held computers, or similar computing device. An exemplary computing device is described in greater detail below in conjunction with FIG. 4. A data store 165 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

The client 140 can include an agent 109 that resides in the physical environment in the client 140. The agent 109 can configure an application 113 that resides in the physical environment to load a plug-in 115 to add functionality to the application 113. An exemplary agent 109 is a DLP agent. For example, the agent 109 can configure the Lotus Notes® email application 113 that resides in the physical environment to load the DLP plug-in 115 for Lotus Notes® to monitor the Lotus Notes® email application 113 to prevent a user from sending emails that contain sensitive data.

A user may wish to load an application 107 in the virtual environment 101 on the client 140. The client 140 can include a virtualization client 103 to obtain a virtualized application package 131 for the application 107 from a streaming server 130 via the network 120 and run the application 107 in the virtual environment 101.

The streaming server 130 can be coupled to a data store that stores one or more virtualized application packages 131. A virtualized application package 131 is a package to stream an application (e.g., application 107) to a client 140 to be loaded in a virtual environment 101 (e.g., sandbox) on the client 140. A server 130 can be hosted by any type of computing device including server computers, gateway computers, desktop computers, laptop computers, hand-held computers or similar computing device. An exemplary computing device is described in greater detail below in conjunction with FIG. 4.

In one embodiment, an application 107 has not yet been virtualized and a virtualized application package 131 does not yet exist for the application 107 on the streaming server 130. The architecture 100 can include a sequencing server 150 that can create a virtualized application package 131 for the application 107 and can deploy the virtualized application package 131 on the streaming server 130 or a presentation server (not shown).

The sequencing server 150 can host a sequencer 151 to receive installation software for an application (e.g., application 107) from a user, such as a system administrator, and can use the installation software of the application 107 to convert the application 107 to a virtualized application package 131. The sequencer 151 can 'sequence the application' which can include monitoring the application installation on the server 150 and recording all the configuration changes which the application makes during the installation process as part of sequence data 153. The sequence data 153 can be stored in a data store 155 that is coupled to the sequence server 150. The sequence data 153 can be a sequence file. A server 150 can be hosted by any type of computing device including server computers, gateway computers, desktop computers, laptop computers, hand-held computers or similar computing device. An exemplary computing device is described in greater detail below in conjunction with FIG. 4.

The sequencing server 150 can include a sequence modifier 152 to modify the sequence data 153 to cause an application 107 to load a plug-in 111 that corresponds to the application 107 in a virtual environment 101 on a client 140. The sequence data 153 can include instructions, such as an instruction that invokes the application 107 in a virtual environment 101. The sequence modifier 152 can embed an instruction in the sequence data 153 to launch a proxy agent 105 in the virtual environment 101 prior to launching the application 107 in the virtual environment 101. The proxy agent 105 is an agent that can configure the application 107 to load a plug-in 111 in the virtual environment 101 when loading the application 107. The sequencing server 150 can package the modified sequence data 153 to create a virtualized application package 131 for the application 107 and can deploy the virtualized application package 131 to the streaming server 130. The virtualized application package 131 includes modified sequence data that will load the proxy agent 105 in the virtual environment 101 prior to loading the application 107 in the virtual environment 101.

The client 140 can include a virtualization client 103 that enables the client 140 to connect to the streaming server 130 and use the virtualized application package 131 from the streaming server 130 to launch the application 107 in a virtual environment 101. The virtualization client 103 can create a virtual environment 101 and can invoke the proxy agent 105 in the virtual environment 101 as specified by the modified sequence data in the virtualized application package 131.

In another embodiment, a virtualized application packaged 131 has sequence data that has not been modified by a sequenced modifier 152. For example, the virtualized application package 131 may include unmodified sequence data that invokes an application 107 in a virtual environment 101 without invoking a proxy agent 105. For instance, a system administrator virtualizes the application 107 first and later decides to add DLP functionality to the application 107. Rather than having a system administrator create a new virtualized application package, the client 140 can include a virtualization helper 104 that can detect the virtualization client 103 attempting to invoke an application 107 in the virtual environment 101. The virtualization helper 104 can intercept a call made by the virtualization client 103 that launches the application 107 and can launch the proxy agent 105 in the virtual environment 101 instead. One embodiment of the virtualization helper invoking the proxy agent 105 in the virtual environment 101 prior to invoking the application 107 in the virtual environment 101 is described in greater detail below in conjunction with FIG. 2.

When the proxy agent 105 is invoked in the virtual environment 101, either as specified by sequence data 153 that has been modified by a sequence modifier 152 or by a virtualization helper 104 that intercepts a call to launch the application 107 made from unmodified sequence data, the proxy agent 105 can communicate with the agent 109 that resides in the physical environment. The proxy agent 105 can request the physical agent 109 to provide the configuration changes pertaining to the particular application 107 that is to be launched in the virtual environment 101. For example, the proxy agent 105 informs the physical agent 109 that the application 107 is an Outlook® email application and the physical agent 109 provides the proxy agent 105 with the configuration changes that the proxy agent 105 should make for the Outlook® email application.

The proxy agent 105 can receive configuration change data that corresponds to the particular application 107, can access the configuration data of the application 107, and can change the configuration data to cause the application 107 to load a plug-in 111 in the virtual environment 101. One embodiment of the proxy agent 105 changing the configuration of an application 107 is described in greater detail below in conjunction with FIG. 2.

After the proxy agent 105 changes the configuration data of the application 107, the application 107 is launched in the virtual environment 101. In one embodiment, the virtualization client 103 launches the application 107 in the virtual environment 101 as specified by modified sequence data. In another embodiment, where the sequence data was not modified, the virtualization helper 104 launches the application 107 in the virtual environment 101. The application's changed configuration data causes the application 107 to load the plug-in 111 in the virtual environment 101 to add functionality to the application 107. For example, the DLP plug-in 111 is now loaded in the virtual environment 101, can monitor data relating to the application 107 running in the virtual environment 101 to prevent the loss of protected data, and can intercept data in the application 107 to prevent data loss. For instance, a DLP Outlook® email plug-in 111 can monitor the Outlook® email application 107 to prevent email users from emailing sensitive information.

Embodiments should not be limited to virtualized applications running on a client device and can be applied to virtualized applications running on a server computer or on a peer-to-peer node.

Figure 2:
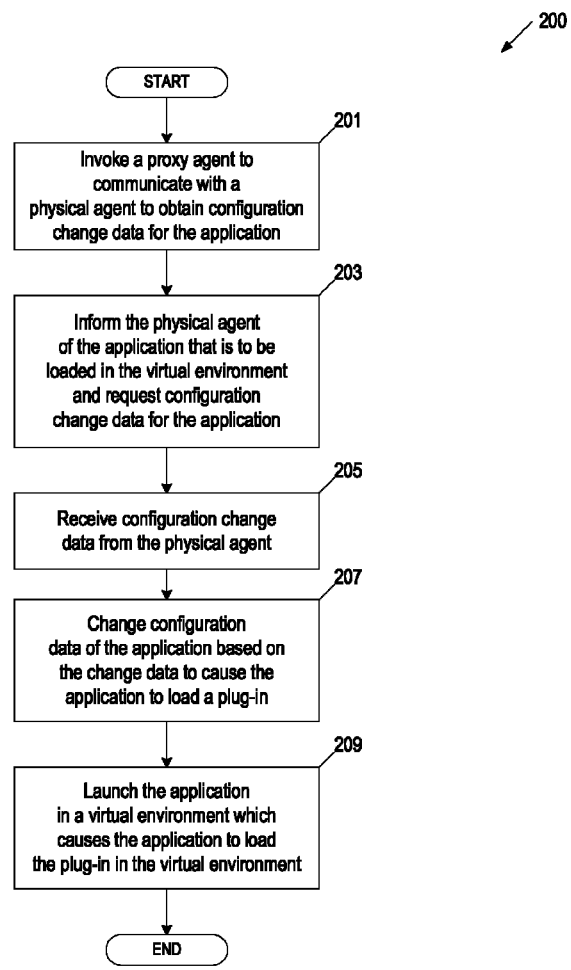
FIG. 2 is a flow diagram of an embodiment of a method for adding plug-in functionality to virtualized applications.

FIG. 2 is a flow diagram of an embodiment of a method 200 for adding plug-in functionality to virtualized applications. Method 200 can be performed by processing logic that can comprise hardware (e.g., circuitry, dedicated logic, programmable logic, microcode, etc.), software (e.g., instructions run on a processing device), or a combination thereof. In one embodiment, method 200 is performed by a computing system, such a client computing system 140 comprising a virtualization helper 104 and proxy agent 105 of FIG. 1.

In one embodiment, a virtualized application package hosted by a streaming server or a presentation server has not been modified by a sequencer modifier hosted by a sequencing server. The virtualized application package includes unmodified sequence data to cause a virtualization layer in a computing system to invoke an application in a virtual environment without invoking a proxy agent. The computing system includes a virtualization layer that invokes a Create Process call to create a process that launches the application in the virtual environment. The virtualization helper can be a shim that resides in a virtualization client (e.g., virtualization client 103 in FIG. 1). A shim is a small library which transparently intercepts an API, changes the parameters passed, handles the operation itself, or redirects the operation elsewhere.

At block 201, the virtualization helper invokes a proxy agent in the virtual environment, instead of immediately launching the application. The virtualization helper detects a Create Process call to launch an application in a virtual environment, intercepts the Create Process call, and launches the proxy agent. The proxy agent communicates with an agent that resides in the physical environment in the computing system. The proxy agent can communicate with the physical agent using an IPC (inter-process communication) mechanism.

At block 203, the proxy agent informs the physical agent that a particular application is to be launched in a virtual environment and requests the physical agent to provide the configuration change data pertaining to the particular application. For example, the proxy agent informs the physical agent that an Outlook® email application is to be loaded in the virtual environment and asks what should be modified in the Outlook® email application to cause the Outlook® email application to load a DLP plug-in in the virtual environment. The physical agent provides the proxy agent with configuration change data for the Outlook® email application.

At block 205, the proxy agent receives the configuration change data from the physical agent. Examples of configuration change data can include, and are not limited to, the location of the configuration data of the application (e.g. location of an INI file, registry, etc.), the data to add to the configuration data of the application, the data to change in the configuration data of the application, the plug-in that is associated with the application, the location of the associated plug-in, etc.

At block 207, the proxy agent accesses the configuration data of the application and changes the configuration data based on the change data received from the physical agent. The proxy agent resides in the virtual environment and has the appropriate rights to access the configuration data of the application configuration. The proxy agent can make the configuration changes in a file (e.g., INI file) or in a registry that causes the application, when invoked, to load a plug-in as specified by configuration change data received from the physical agent.

At block 209, the virtualization helper launches the application in the virtual environment. The application reads the changes made to its configuration data and loads the plug-in, which adds functionality to the application. An exemplary plug-in is a DLP plug-in. A DLP plug-in can protect sensitive information maintained by an organization. Sensitive information may be stored in a structured form such as a database, a spreadsheet, etc., and may include, for example, customer, employee, patient or pricing data. In addition, sensitive information may include unstructured data such as design plans, source code, CAD drawings, financial reports, human resources reports, customer or patient reports, pricing documentation, corporate mergers and acquisitions documentation, government (e.g. Securities and Exchange Commission) filings, and any other sensitive information that requires restricted user access.

The DLP plug-in protects sensitive information using DLP policies. A DLP policy includes rules for monitoring and/or scanning content to detect the presence of sensitive information. The content to be monitored and/or scanned can relate to a virtualized application that may potentially contain content with sensitive information. In addition, the content to be scanned may include documents associated with a client device such as user devices. Documents associated with a user device may include documents stored locally on user device and network-based documents stored for user device (e.g., as part of NAS or SAN system). A document can be a file, a message, a web request or any other data item that is stored on a storage medium and is accessible using a name or any other identifier.

When monitoring content for the presence of sensitive information, the DLP plug-in may use fingerprints of the source data to facilitate more efficient searching of the content. Fingerprints may include hashes of source data, encrypted source data, or any other signatures uniquely identifying the source data. The DLP plug-in may use fingerprints when scanning documents for sensitive information in accordance with one or more DLP policies. A policy may include a set of rules that specify what sensitive information (e.g., confidential data stored in a secure repository or a secure database) needs to be present in the content being scanned in order to trigger a policy violation. In addition, policies may specify when particular content should be scanned, which content (e.g., files accessible to employees of an organization or email messages stored on a mail server of the organization) should be scanned, etc. Further, policies may specify which actions should be taken when the documents being scanned contain sensitive information. For example, the policy may require that access to the content be blocked, reported, etc. A computing system can be coupled via a network to a data loss prevention system residing on a machine (e.g., a server computer system, a gateway, a personal computer, etc.) that creates DLP policies (e.g., based on user input or based on relevant regulations) and distributes relevant DLP policies to various entities. For example, DLP policies pertaining to scanning content stored on user devices (e.g., client computing system) are distributed to user devices. DLP policies may request that content relating to virtualized applications be scanned frequently to prevent loss of sensitive information.

For example, the Outlook® email application loads a DLP plug-in for Outlook® in the virtual environment. The DLP plug-in can monitor data relating to the Outlook® email application running in the virtual environment to prevent email users from emailing sensitive information. Whenever a user sends an email message, before the email message is sent, the Outlook® email application provides the DLP plug-in a callback notifying that an email message is being sent. Before the email message is sent, the DLP plug-in can process the content by performing detection technology on the content to determine whether there is any sensitive data in the content of the email message. Based on a security policy, the DLP plug-in can block the email message or allow the email message to be sent.

Figure 3:
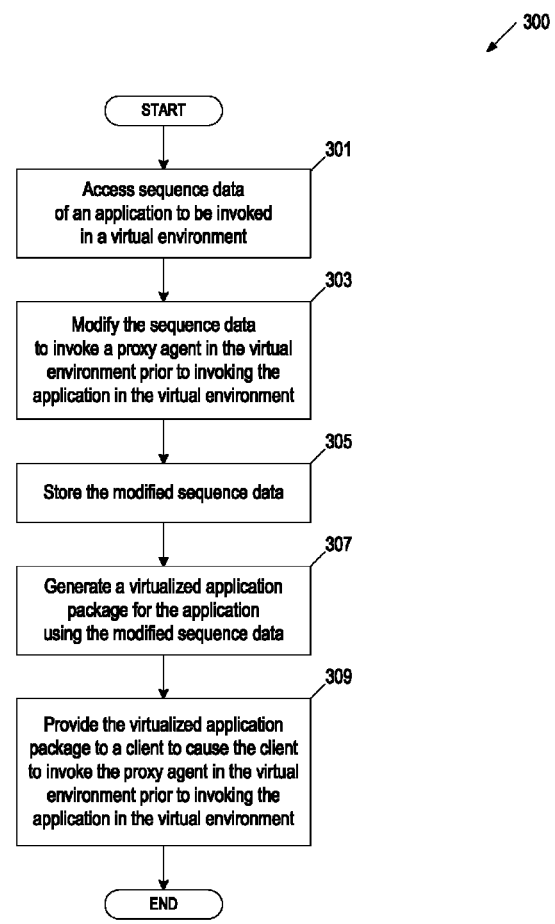
FIG. 3 is a flow diagram of an embodiment of a method for modifying sequence data to add plug-in functionality to virtualized applications.

FIG. 3 is a flow diagram of an embodiment of a method 300 for modifying sequence data to add plug-in functionality to virtualized applications. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by the sequence modifier 152 hosted by a sequencing server 150 of FIG. 1.

In one embodiment, an application has not yet been virtualized and a virtualized application package does not yet exist for the application. A sequencing server can receive installation software for an application, for example, from a system administrator, and can use the installation software of the application to convert the application to a virtualized application package. The sequencing server can monitor the application installation on the server and create sequence data (e.g., a sequence file) to be used in creating the virtualized application package for the application. The sequence data can be stored in a data store that is coupled to the sequencing server.

At block 301, the sequence modifier accesses the sequence data of the application. The sequence data includes instructions, such as an instruction that invokes the application in a virtual environment. At block 303, the sequence modifier embeds an instruction in the sequence data to launch a proxy agent in the virtual environment prior to launching the application in the virtual environment. At block 305, the sequence modifier stores the modified sequence data in the data store. At block 307, the sequencing server can use the modified sequence data to create a virtualized application package for the application and can deploy the virtualized application package that invokes a proxy agent prior to invoking the application on a streaming server or a presentation server at block 309.

For example, a user wishes to virtualize an Outlook® email application. The installation of the Outlook® email application is performed on a sequence server. The sequencer monitors the Outlook® installation and creates a sequence file. The sequence modifier modifies the sequence file by adding an instruction in the sequence to launch a proxy agent in a virtual environment prior to launching the Outlook® email application in the virtual environment. The sequence server then deploys a 'modified virtualized application package' onto a streaming server. When a computing system connects to the streaming server, the 'modified virtualized application' is streamed to the computing system. The modified sequence causes the computing system to invoke the proxy agent before the invoking the Outlook® email application. The proxy agent changes the configuration of the Outlook® email application to cause the Outlook® email application, when launched, to load a DLP plug-in in the virtual environment.

Figure 4:
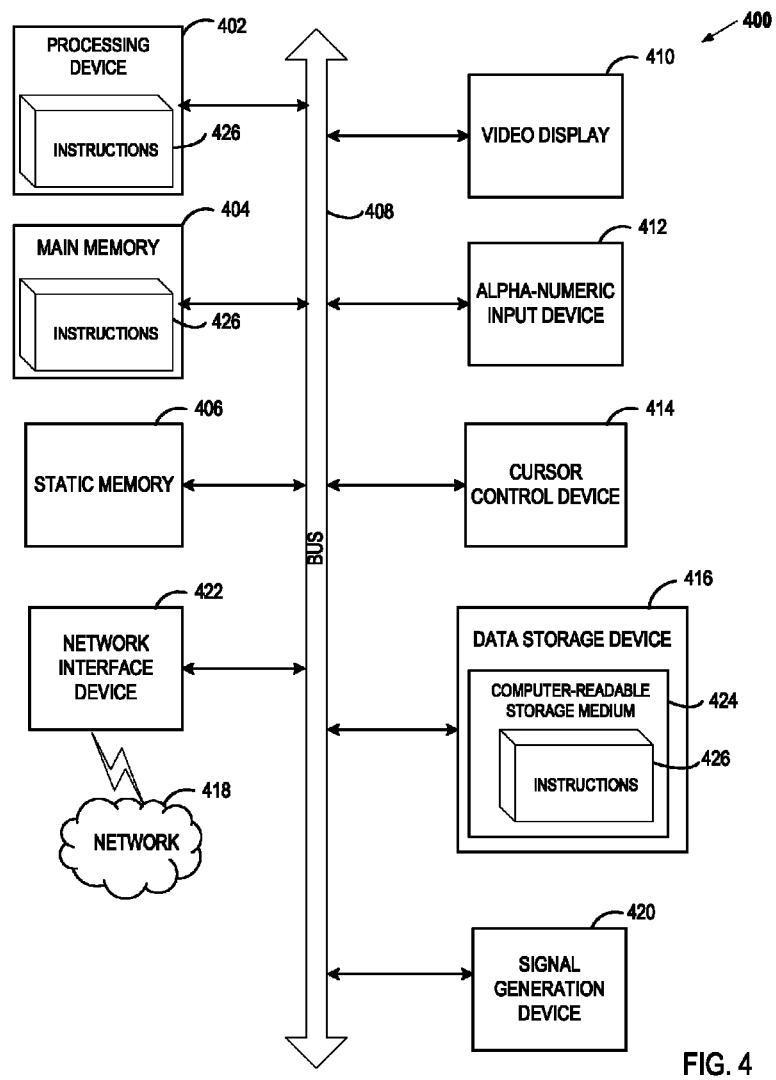
FIG. 4 is a diagram of one embodiment of a computer system for adding plug-in functionality to virtualized applications.

FIG. 4 is a diagram of one embodiment of a computer system for adding plug-in functionality to virtualized applications. Within the computer system 400 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or DRAM (RDRAM), etc.), a static memory 406 (e.g., flash memory, static random access memory (SRAM), etc.), and a secondary memory 416 (e.g., a data storage device in the form of a drive unit, which may include fixed or removable computer-readable storage medium), which communicate with each other via a bus 408.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute the instructions 426 for performing the operations and steps discussed herein.

The computer system 400 may further include a network interface device 422. The computer system 400 also may include a video display unit 410 (e.g., a liquid crystal display (LCD) or a cathode ray tube (CRT)) connected to the computer system through a graphics port and graphics chipset, an alphanumeric input device 412 (e.g., a keyboard), a cursor control device 414 (e.g., a mouse), and a signal generation device 420 (e.g., a speaker).

The secondary memory 416 may include a machine-readable storage medium (or more specifically a computer-readable storage medium) 424 on which is stored one or more sets of instructions 426 embodying any one or more of the methodologies or functions described herein. The instructions 426 may also reside, completely or at least partially, within the main memory 404 and/or within the processing device 402 during execution thereof by the computer system 400, the main memory 404 and the processing device 402 also constituting machine-readable storage media. The instructions 426 may further be transmitted or received over a network 418 via the network interface device 422.

The computer-readable storage medium 424 may also be used to store the instructions 426 persistently. While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 426, components and other features described herein (for example in relation to FIG. 1) can be implemented as discrete hardware components or integrated in the functionality of hardware components such as ASICS, FPGAs, DSPs or similar devices. In addition, the instructions 426 can be implemented as firmware or functional circuitry within hardware devices. Further, the instructions 426 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "invoking," "changing," "launching," "intercepting," "modifying," "providing," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for adding plug-in functionality to virtualized applications is described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, implemented by a computing system programmed to perform the following, comprising:
    invoking, by the computing system, a proxy agent in a virtual environment hosted by the computing system to obtain configuration change data for a virtualized application from an agent residing in a physical environment hosted by the computing system;
    changing, by the proxy agent hosted by the computing system, a configuration of the virtualized application based on the configuration change data to cause the virtualized application to load a plug-in in the virtual environment; and
    launching, by the computing system, the virtualized application in the virtual environment, wherein the virtualized application loads the plug-in in the virtual environment to utilize a function of the plug-in in the virtual environment, the plug-in being a data loss protection plug-in to prevent loss of protected data.

2. The method of claim 1, wherein the protected data pertains to the virtualized application executing in the virtual environment.

3. The method of claim 1, wherein the agent residing in the physical environment is a data loss protection agent to configure an application residing in the physical environment to prevent loss of protected data pertaining to the application residing in the physical environment.

4. The method of claim 1, wherein the configuration change data comprises at least one of:
    a location of the configuration of the virtualized application, data to change in the configuration of the virtualized application, a plug-in that is associated with the virtualized application, and a location of the associated plug-in.

5. The method of claim 1, wherein invoking the proxy agent comprises:
    intercepting, by a virtualization helper, a call to launch the virtualized application in the virtual environment.

6. The method of claim 1, wherein invoking the proxy agent comprises:
    executing a call to launch the virtualized application in the virtual environment based on modified sequence data received from a second computing system.

7. The method of claim 1, wherein the computing system is a client computing system.

8. A system comprising:
a memory; and
a processor coupled with the memory to
- invoke a proxy agent in a virtual environment to obtain configuration change data for a virtualized application from an agent residing in a physical environment, wherein the proxy agent changes the configuration data of the virtualized application based on configuration change data received from the physical agent to cause the virtualized application to load a plug-in in the virtual environment, and
- launch the virtualized application in the virtual environment, wherein the virtualized application loads the plug-in in the virtual environment to utilize a function of the plug-in in the virtual environment, the plug-in being a data loss protection plug-in to prevent loss of protected data.

9. The system of claim 8, wherein the protected data pertains to the virtualized application executing in the virtual environment.

10. The system of claim 8, wherein the agent residing in the physical environment is a data loss protection agent to configure an application residing in the physical environment to prevent loss of protected data pertaining to the application residing in the physical environment.

11. The system of claim 8, wherein the configuration change data comprises at least one of:
- a location of the configuration of the virtualized application, data to change in the configuration of the virtualized application, a plug-in that is associated with the virtualized application, and a location of the associated plug-in.

12. The system of claim 8, wherein to invoke the proxy agent comprises a virtualization helper hosted by the processor:
- to intercept a call to launch the virtualized application in the virtual environment.

13. The system of claim 8, wherein the system is a client computing system.

14. The system of claim 8, wherein to invoke the proxy agent comprises the processor:
- to execute a call to launch the virtualized application in the virtual environment based on modified sequence data.

15. A non-transitory computer readable storage medium including instructions that, when executed by a processor, cause the processor to perform a set of operations comprising:
- invoking, by the processor, a proxy agent in a virtual environment hosted by the computing system to obtain configuration change data for a virtualized application from an agent residing in a physical environment hosted by the computing system;
- changing, by the proxy agent hosted by the computing system, a configuration of the virtualized application based on the configuration change data to cause the virtualized application to load a plug-in in the virtual environment; and
- launching, by the computing system, the virtualized application in the virtual environment, wherein the virtualized application loads the plug-in in the virtual environment to utilize a function of the plug-in in the virtual environment, the plug-in being a data loss protection plug-in to prevent loss of protected data.

16. The non-transitory computer readable storage medium of claim 15, wherein the agent residing in the physical environment is a data loss protection agent to configure an application residing in the physical environment to prevent loss of protected data pertaining to the application residing in the physical environment.

17. The non-transitory computer readable storage medium of claim 15, wherein the configuration change data comprises at least one of:
- a location of the configuration of the virtualized application, data to change in the configuration of the virtualized application, a plug-in that is associated with the virtualized application, or a location of the associated plug-in.

18. The non-transitory computer readable storage medium of claim 15, wherein invoking the proxy agent comprises at least one of:
- intercepting, by a virtualization helper, a call to launch the virtualized application in the virtual environment or executing a call to launch the virtualized application in the virtual environment based on modified sequence data received from a second computing system.

* * * * *